(No Model.) 2 Sheets—Sheet 2.

J. HENSEY.
CATTLE GUARD.

No. 597,977. Patented Jan. 25, 1898.

WITNESSES:
H. Sellyn.
C. R. Ferguson

INVENTOR
J. Hensey
BY
ATTORNEYS.

UNITED STATES PATENT OFFICE.

JAMES HENSEY, OF WARREN, ARKANSAS.

CATTLE-GUARD.

SPECIFICATION forming part of Letters Patent No. 597,977, dated January 25, 1898.

Application filed April 23, 1897. Serial No. 633,461. (No model.)

*To all whom it may concern:*

Be it known that I, JAMES HENSEY, of Warren, in the county of Bradley and State of Arkansas, have invented a new and Improved Cattle-Guard, of which the following is a full, clear, and exact description.

This invention relates to guards or gates employed to prevent cattle or other animals from passing over railroads or similar dangerous or restricted places; and the object is to provide a guard or gate for this purpose that will embody simplicity and durability and which will be of comparatively low cost for construction, and, further, to so arrange the parts that they will act with certainty in both closing and opening.

I will describe a cattle-guard embodying my invention, and then point out the novel features in the appended claims.

Reference is to be had to the accompanying drawings, forming a part of this specification, in which similar characters of reference indicate corresponding parts in all the views.

Figure 1:
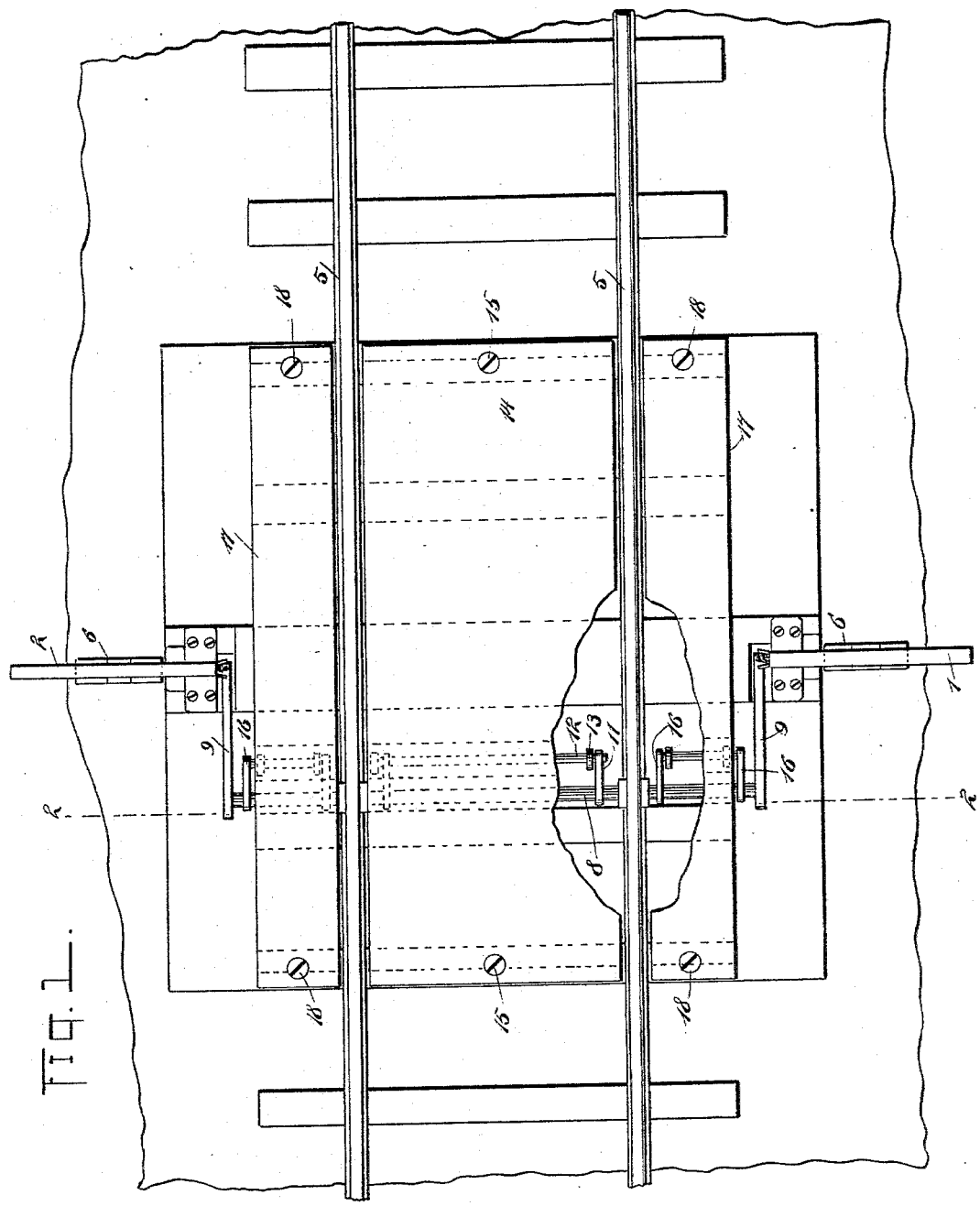
Figure 2:
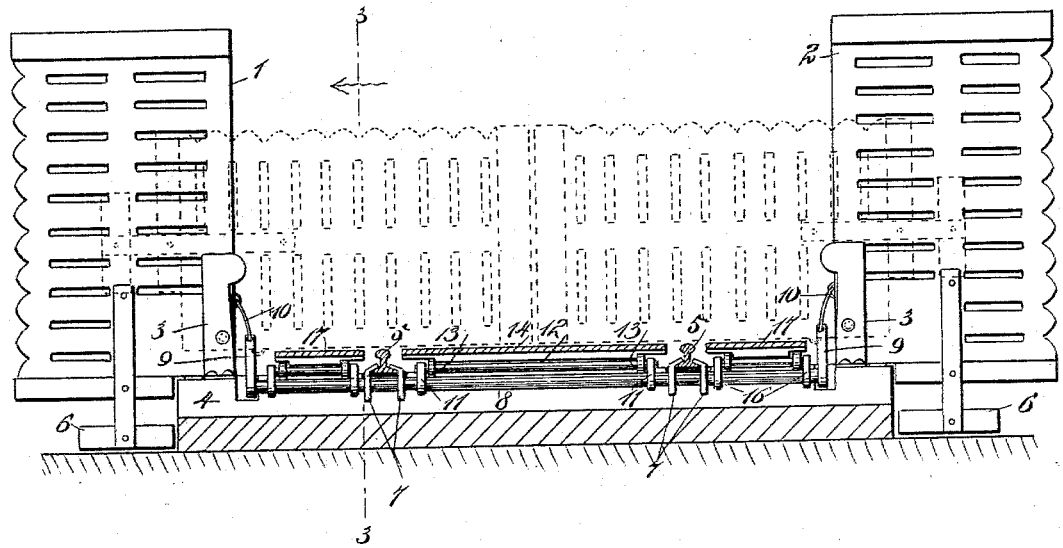
Figure 3:
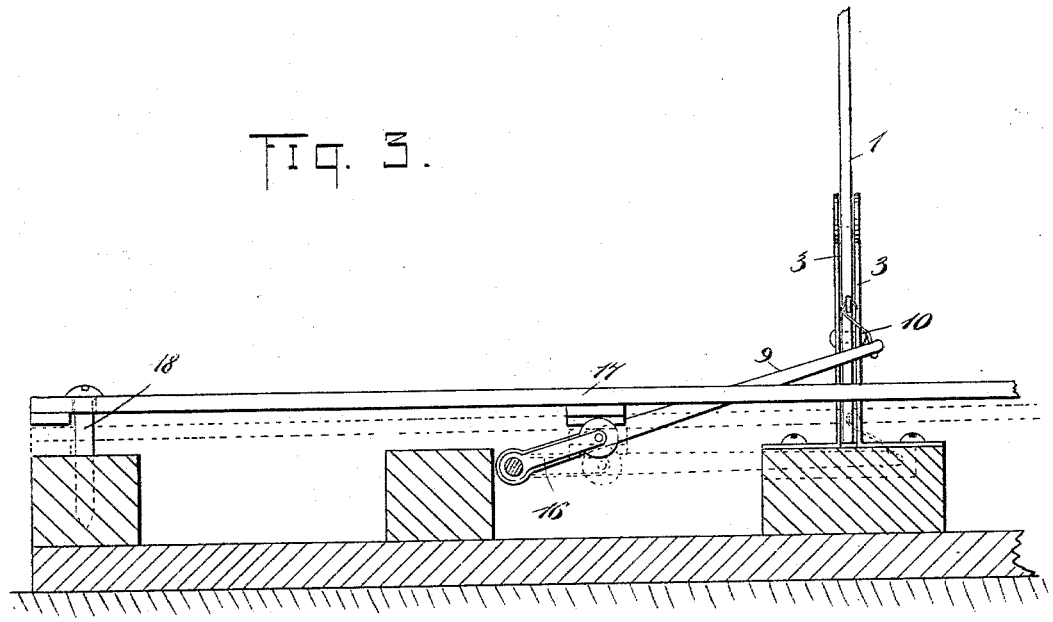

Figure 1 is a plan view of a cattle-guard embodying my invention. Fig. 2 is a partial elevation and partial section on the line 2 2 of Fig. 1, and Fig. 3 is a section on the line 3 3 of Fig. 2.

The guard comprises two gates 1 2, mounted to swing back and forth between vertical and horizontal positions. As here shown, the gates are pivoted at their lower portion and near their outer ends between standards 3, extended upward from a cross-beam 4, arranged beneath the track-rails 5. The standards 3 extend upward a considerable distance above the pivotal points of the gates, so as to form braces for said gates when in either their open or closed position. The outer ends of the gates 1 and 2 are provided with counterbalances, here shown as weights 6, attached to arms extended outward from the outer ends of said gates.

Extended underneath the track-rails 5 and having bearings in hangers 7, attached to the track-rails, is a rock-shaft 8. This rock-shaft extends somewhat beyond the outer sides of the track-rails, and the ends are provided with levers 9, having link connections 10 with the gates just above their pivotal point when in an open position.

Between the track-rails 5 arms 11 extend from the rock-shaft 8 at a slightly-upward angle, and these arms 11 are connected by a bar 12, upon which antifriction-rollers 13 are mounted to rotate. Bearing upon the antifriction-rollers 13 between the track-rails is a platform 14, mounted to move vertically. As here shown, the platform 14 is guided in its vertical movement by means of bolts 15, extended from cross-ties of the railway loosely through openings in the platform. At the outer side of the track-rails 5 the rock-shaft 8 is provided with arms 16, and these arms 16 support shafts which have antifriction-rollers mounted upon them and upon which narrow platforms 17 bear. These narrow platforms 17 at the outer sides of the track-rails are of course movable vertically in a similar manner to the first platform or to the platform between the rails, and they are guided in their movements by bolts 18, extended upward from ties through openings in the platforms.

The platforms may extend any desired distance at both sides of the gate or guard, and it is obvious that should an animal step upon either one of the platforms the same will be moved downward sufficiently to rock the shaft 8 to draw the gates 1 and 2 to their closed position, as indicated by dotted lines in Fig. 2. This of course will obstruct the passage of the animal and the animal will naturally return or leave the platform. Then when relieved of the weight the counterbalance-weights 6 rock the gates or guards to their normal open position.

It is obvious that counterbalancing-springs may be employed in lieu of the weights shown.

Having thus described my invention, I claim as new and desire to secure by Letters Patent—

1. A cattle-guard, comprising a gate mounted to swing transversely of a railway-track, a rock-shaft extended across the track, a lever on said rock-shaft, a link connection between the lever and gate, arms extended from the rock-shaft between the rails at an upward angle, and a platform bearing on said arms, substantially as specified.

2. A cattle-guard, comprising two gates pivoted to swing transversely of a railway-track, a rock-shaft extended across the track, levers on the outer ends of said rock-shafts, link connections between said levers and the gates, arms extended from the shaft between the track-rails at an upward angle, a platform bearing upon said arms, other arms on said shaft at the outer sides of the track-rails, a platform bearing upon said outer arms, and counterbalance devices for each gate, substantially as specified.

3. A railway cattle-guard, comprising gates pivoted to standards at the sides of the track, the said pivots being extended horizontally, a rock-shaft extended beneath the track-rails and having bearings in hangers depending from the rails, levers on the outer ends of said rock-shaft, link connections between the levers and the gates, arms extended at an upward angle from said rock-shaft between the track-rails, rollers supported by the said arms, a platform resting upon said rollers, guides for the vertical movement of said platform, other arms extended at an upward angle from the rock-shaft at the outer ends of the track-rails, rollers carried by said outer arms, platforms resting on said rollers, guides for the vertical movement of the outer platform, and counterbalance-weights secured to the pivotal connection of the gates, substantially as specified.

JAMES HENSEY.

Witnesses:
E. CALLAHAN,
ANNIE WERLING.